(12) United States Patent
Carrier

(10) Patent No.: US 7,131,685 B2
(45) Date of Patent: Nov. 7, 2006

(54) AUTOMOTIVE DOOR TRIM PANEL HAVING AN INTEGRATED SEAL

(75) Inventor: Rod Carrier, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 89 days.

(21) Appl. No.: 10/907,452

(22) Filed: Apr. 1, 2005

(65) Prior Publication Data

US 2006/0220415 A1  Oct. 5, 2006

(51) Int. Cl.
B60J 10/08 (2006.01)

(52) U.S. Cl. .................. 296/146.9; 296/146.7

(58) Field of Classification Search ............ 296/146.7, 296/146.9, 199, 39.3, 1.08, 209
See application file for complete search history.

(56) References Cited

U.S. PATENT DOCUMENTS

| | | | |
|---|---|---|---|
| 4,360,241 A | 11/1982 | Fukunaga | |
| 4,885,121 A | 12/1989 | Patel | |
| 5,076,631 A | 12/1991 | Lord, Jr. ................... | 296/37.8 |
| 5,111,619 A * | 5/1992 | Billin et al. ............... | 296/39.1 |
| 5,345,720 A * | 9/1994 | Illbruck et al. .......... | 296/146.7 |
| 5,462,482 A * | 10/1995 | Grimes .................... | 296/146.7 |
| 5,505,024 A * | 4/1996 | DeRees et al. .......... | 296/146.5 |
| 5,526,549 A | 6/1996 | Mori et al. .............. | 16/2 |
| 5,567,916 A | 10/1996 | Napiorkowski et al. | |
| 5,595,415 A * | 1/1997 | Beaulat ................... | 296/146.5 |
| 5,601,261 A | 2/1997 | Koike ...................... | 248/71 |
| 5,618,477 A | 4/1997 | Suzuki .................... | 264/46.5 |
| 5,639,993 A | 6/1997 | Ideno et al. ............. | 174/153 |
| 5,695,865 A | 12/1997 | Shimizu .................. | 428/212 |
| 5,716,044 A | 2/1998 | Peterson et al. | |
| 5,836,048 A | 11/1998 | Rossman et al. | |
| 5,866,232 A | 2/1999 | Gatzmanga ............. | 428/122 |
| 5,927,020 A | 7/1999 | Kobrehel | |
| 5,947,547 A | 9/1999 | Deeks et al. ............ | 296/146.7 |
| 5,981,877 A | 11/1999 | Sakata et al. ............ | 174/153 |
| 6,064,003 A | 5/2000 | Moore et al. ............ | 174/65 |
| 6,076,882 A | 6/2000 | Szerdahelyi et al. .... | 296/146.1 |
| 6,119,406 A | 9/2000 | Gulisano et al. ........ | 9/502 |
| 6,183,038 B1 | 2/2001 | Hansen et al. .......... | 396/146.7 |
| 6,196,607 B1 | 3/2001 | Gulisano ................. | 296/39.1 |

(Continued)

FOREIGN PATENT DOCUMENTS

DE    3827852    3/1989

(Continued)

OTHER PUBLICATIONS

Combined Search and Examination Report under Sections 17 and 18(3); Jun. 1, 2006; 6 pages.

(Continued)

Primary Examiner—Kiran B. Patel
(74) Attorney, Agent, or Firm—Wood, Herron & Evans, L.L.P.

(57) ABSTRACT

A door trim panel includes a substrate member having a front surface adapted to face an interior compartment of a vehicle. A sealing member is integrally molded with the front surface of the substrate member and projects therefrom. The trim panel is adapted to be mounted to a door of the vehicle wherein the door is moveable between open and closed positions with respect to a vehicle body. The sealing member is adapted to engage a portion of the vehicle body so as to form a seal between the trim panel and the vehicle body when the door is in the closed position. A two-shot molding process may be used to make the trim panel with the substrate member being formed in the first shot and the sealing member being molded with the front surface of the substrate member in the second shot.

15 Claims, 4 Drawing Sheets

U.S. PATENT DOCUMENTS

| | | | |
|---|---|---|---|
| 6,197,403 B1 | 3/2001 | Brown et al. | 428/137 |
| 6,210,613 B1 | 4/2001 | Stein et al. | 264/45.4 |
| 6,226,927 B1 * | 5/2001 | Bertolini et al. | 49/502 |
| 6,299,236 B1 * | 10/2001 | Praud et al. | 296/146.7 |
| 6,308,488 B1 | 10/2001 | Hoshino | 52/716.5 |
| 6,348,169 B1 | 2/2002 | Stipes et al. | |
| 6,354,651 B1 | 3/2002 | Mori | |
| 6,372,995 B1 | 4/2002 | Mochizuki et al. | 174/152 |
| 6,393,766 B1 * | 5/2002 | Nozaki et al. | 49/498.1 |
| 6,412,852 B1 * | 7/2002 | Koa et al. | 296/146.7 |
| 6,422,640 B1 | 7/2002 | Whitehead et al. | 296/146.7 |
| 6,425,208 B1 * | 7/2002 | Klueger et al. | 49/502 |
| 6,447,047 B1 * | 9/2002 | Marcovecchio et al. | 296/146.7 |
| 6,525,269 B1 | 2/2003 | Sato | 174/65 |
| 6,536,835 B1 | 3/2003 | Murakami et al. | |
| 6,562,275 B1 | 5/2003 | Martinez | 264/308 |
| 6,564,433 B1 | 5/2003 | Nagasawa | 24/297 |
| 6,594,955 B1 * | 7/2003 | Delire et al. | 49/502 |
| 6,616,216 B1 * | 9/2003 | Furuyama et al. | 296/146.7 |
| 6,619,725 B1 | 9/2003 | Gehringhoff et al. | |
| 6,656,397 B1 | 12/2003 | Hansen et al. | 264/45.4 |
| 6,659,536 B1 | 12/2003 | Chamberlain et al. | 296/146.5 |
| 6,660,937 B1 | 12/2003 | MacLeod et al. | 174/65 |
| 6,669,267 B1 | 12/2003 | Lynam et al. | 296/146.5 |
| 6,676,195 B1 * | 1/2004 | Marriott et al. | 296/146.7 |
| 6,683,257 B1 | 1/2004 | Roberts et al. | 174/135 |
| 6,698,140 B1 * | 3/2004 | Tatsumi et al. | 296/146.6 |
| 6,703,129 B1 | 3/2004 | Kakehi et al. | 428/409 |
| 6,767,049 B1 | 7/2004 | Morrison et al. | |
| 6,857,688 B1 | 2/2005 | Morrison et al. | |
| 6,895,634 B1 | 5/2005 | Tisbo | |
| 6,926,340 B1 * | 8/2005 | Moriyama | 296/146.6 |
| 6,932,415 B1 * | 8/2005 | Van Houzen et al. | 296/146.9 |
| 6,953,897 B1 | 10/2005 | Marroquin et al. | |
| 2001/0017476 A1 * | 8/2001 | Nishikawa et al. | 296/146.7 |
| 2001/0030444 A1 | 10/2001 | Whitehead et al. | |
| 2002/0084674 A1 * | 7/2002 | Dobson | 296/146.7 |
| 2002/0101096 A1 | 8/2002 | Nagasawa | |
| 2002/0125734 A1 | 9/2002 | Pokorzynski et al. | |
| 2003/0001408 A1 | 1/2003 | Hockenberry et al. | |
| 2003/0015339 A1 | 1/2003 | Sato | |
| 2003/0093883 A1 | 5/2003 | Gibbons et al. | |
| 2005/0140166 A1 | 6/2005 | Dry et al. | |
| 2005/0184555 A1 * | 8/2005 | Williams et al. | 296/146.7 |
| 2006/0043764 A1 * | 3/2006 | Schroder et al. | 296/146.7 |

FOREIGN PATENT DOCUMENTS

| | | |
|---|---|---|
| DE | 2417463 | 3/2006 |
| EP | 1128077 | 8/2001 |
| EP | 1215084 A2 | 6/2002 |
| FR | 2704487 | 11/1994 |
| GB | 2287740 A | 9/1995 |
| GB | 2360322 | 9/2001 |
| GB | 2397088 | 7/2004 |
| JP | 3157222 | 7/1991 |
| JP | 7323440 | 12/1995 |
| WO | 02/06682 | 1/2002 |

OTHER PUBLICATIONS

Office Action Summary, U.S. Appl. No. 10/708,407,, filed May 9, 2005.

Berta et al., U.S. Appl. No. 10/241,211, filed Sep. 11, 2002.

*Combined Search and Examination Report under Sections 17 and 18*(3).

Murakami et al., U.S. Appl. No. 10/077,815, filed Feb. 20, 2002.

*Combined Search and Examination Report under Section 17 and 18*(3).

* cited by examiner

AUTOMOTIVE DOOR TRIM PANEL HAVING AN INTEGRATED SEAL

CROSS-REFERENCE

The present invention is related to U.S. Ser. No. 10/708,407, filed Mar. 1, 2004, U.S. Ser. No. 10/710,655, filed Jul. 27, 2004, U.S. Ser. No. 10/711,478, filed Sep. 21, 2004, and U.S. Ser. No. 10/907,162, filed Mar. 23, 2005.

FIELD OF THE INVENTION

The present invention pertains generally to trim assemblies for vehicle interiors, and more particularly to a trim panel and a method of making the same having an integrated seal.

BACKGROUND OF THE INVENTION

It is known to provide vehicle interiors with various trim assemblies to enhance the aesthetic appearance of the interior and to provide comfort, as well as convenience, to vehicle occupants. For example, automotive door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing facade viewed by occupants seated in the passenger compartment of the motor vehicle. Controls are provided on the trim panel for devices such as seats, door locks, mirrors and windows. The door latch may be connected by a cable to an inner release handle on the trim panel accessible to the vehicle occupant.

Automotive doors may be coupled with a vehicle body in a number of ways. For instance, the automotive door may be hingedly attached to the vehicle body so that the door may be rotated about the hinge between an open and closed position so as to allow passenger ingress and egress of the passenger compartment or to allow access to storage space within the vehicle. Automotive doors may also be configured as sliding doors where doors are opened by moving the door away from or outward of the vehicle body and then sliding the door along a track so as to allow passenger ingress and egress of the passenger compartment. In any event, when a door is in a closed position, a gap may exist between the door and vehicle body along a substantial portion of the door's periphery. These gaps are generally undesirable as the gaps provide pathways for the ingress of air, water or moisture, and road noise into the passenger compartment of the vehicle.

To reduce or eliminate the undesirable effects of air, water and noise within the passenger compartment, a resilient seal may be positioned along the periphery of the door so that when the door is closed, the seal contacts the vehicle body to fill the gaps between the door and the vehicle body and prevent the ingress of air, water and road noise. In many instances, the seal is coupled to the periphery of the door along the inner sheet metal panel as there is no part of the trim panel that forms a gap with the vehicle body when the door is in the closed position. In other instances, however, the trim panel covers the interior of the door such that a portion of the trim panel provides the portion of the door that forms a gap with the vehicle body. For example, the sliding door(s) on many minivans have a trim panel such that a lower portion of the trim panel forms a gap with the vehicle body, such as along the scuff plate on the vehicle body adjacent the sliding door. As before, the gaps between the trim panel and the vehicle body provide a pathway for air, water and road noise. Thus, a resilient seal is generally attached to the trim panel such that when the door is closed, the seal contacts the vehicle body to fill the gaps between the trim panel and the vehicle body and prevent the ingress of air, water and road noise.

Trim panels having a seal attached thereto have some drawbacks. One primary drawback is in the manufacturing of the trim panel. For instance, a trim panel may be formed by known methods, such as various molding processes. A resilient seal is generally formed through a process completely separate from that of making the trim panel. For example, the seal may be made through a known process, such as an extrusion process, at one location and then packaged and shipped to the manufacturer of the trim panel. The seal must then be attached to the trim panel in an additional processing step. For instance, the seal may be attached through an adhesion process, which involves an operator applying an adhesive onto the seal and/or trim panel and then manually locating the seal on the trim panel. Alternately, the trim panel may have a rail formed therein during the formation of the trim panel, such as through the molding process, and the seal configured such that an operator may slidingly engage the seal with the rail to secure the seal with the trim panel.

These above-described methods of constructing a trim panel having a seal not only require additional operating steps to form the trim panel, but also require additional parts which must appropriately supplied, tracked, shipped, inventoried and eventually assembled to make the complete product. Multiple manufacturing steps and multiple part assemblies lead to significant operating costs, administrative costs and labor costs, which increase the overall costs of production.

There is thus a need for an improved door trim panel having a seal and a method of making the same that reduces the number of manufacturing steps, number or parts, and the labor required for assembly thereof, thereby reducing overall manufacturing costs.

SUMMARY OF THE INVENTION

The present invention provides an door trim panel and method of making the same that overcomes these and other shortcomings of the previous methods. The trim panel includes a substrate member forming at least a part of the structural support of the trim panel and has a front surface adapted to face an interior compartment of a vehicle. A sealing member is integrally molded with the front surface of the substrate member and projects therefrom. The trim panel is adapted to be mounted to a door of the vehicle wherein the door is moveable between open and closed positions with respect to a vehicle body. The sealing member is adapted to engage a portion of the vehicle body so as to form a seal between the trim panel and the vehicle body when the door is in the closed position.

In one embodiment of the invention, the substrate member has a first hardness and the sealing member has a second hardness that is relatively lower than the first hardness of the substrate member. The substrate member may be made from various materials. Examples include thermoplastic or thermoset polymers, such as a thermoplastic olefin (e.g. polypropylene). The sealing member may be made from a softer and/or resilient material, such as a thermoplastic elastomer. Moveover, the trim panel may include a cover member disposed over at least a portion of the front surface of the substrate member to provide a soft feel and a more aeshetically pleasing appearance to the trim panel. The cover member may be made from the same material as the sealing member.

In another embodiment of the invention, an automobile includes a vehicle body having an opening for providing access to an interior compartment of the automobile, such as for example, the passenger compartment. A door is coupled with the vehicle body for covering the opening and is moveable relative to the vehicle body between an open position allowing access to the interior compartment and a closed position preventing access to the interior compartment. A trim panel is mounted to the door and includes a front surface adapted to face the interior compartment when the door is in the closed position. A sealing member is integrally molded with the front surface of the trim panel and projects therefrom. The sealing member is adapted to engage a portion of the vehicle body so as to form a seal between the trim panel and the vehicle body when the door is in the closed position.

The trim panel of the invention may be formed in a two-shot molding process. A first curable material is injected into a mold during a first shot of the molding process to form the substrate member having a front surface. A first mold chamber is formed about at least a portion of the front surface of the substrate member. A second curable material is then injected into the first mold chamber in a second shot of the molding process to form the sealing member. The cover member may also be formed on the front surface of the substrate member during the second shot of the molding process. The method of the invention advantageously provides a streamlined manufacturing process that reduces the number of parts, operational steps and labor associated with assembly of the trim panel, thereby reducing the overall manufacturing costs of the trim panel.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
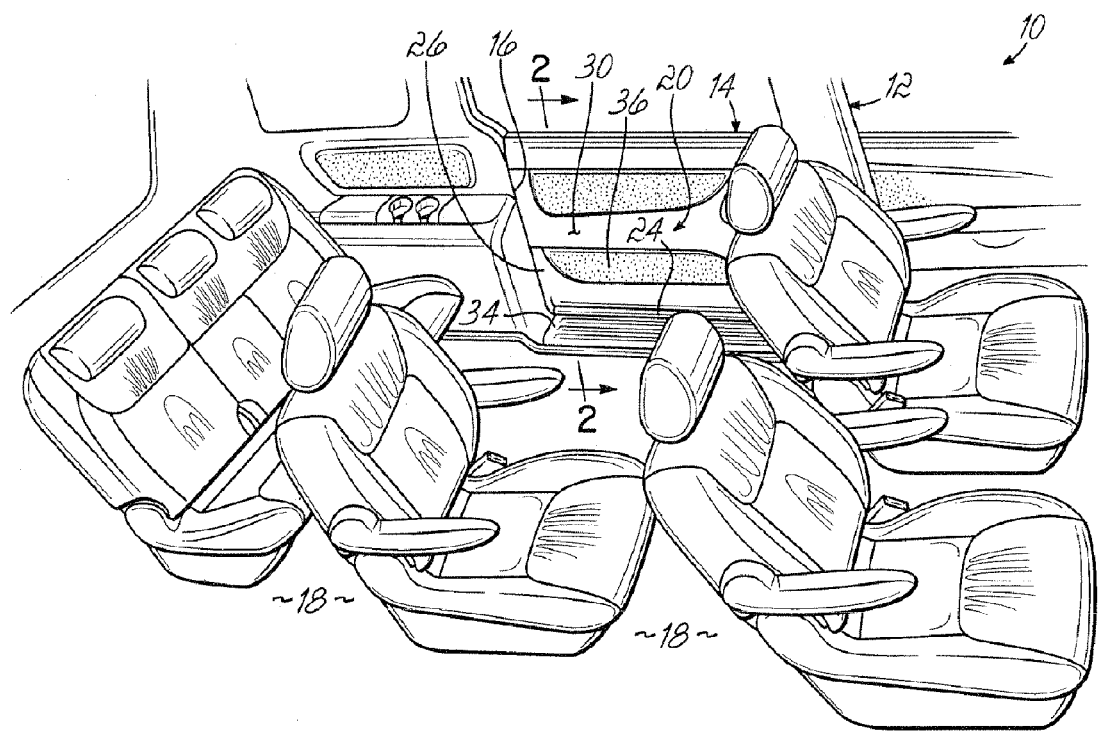
FIG. 1 is a perspective view of a vehicle interior having a door with a trim panel in accordance with the invention.
Figure 2:
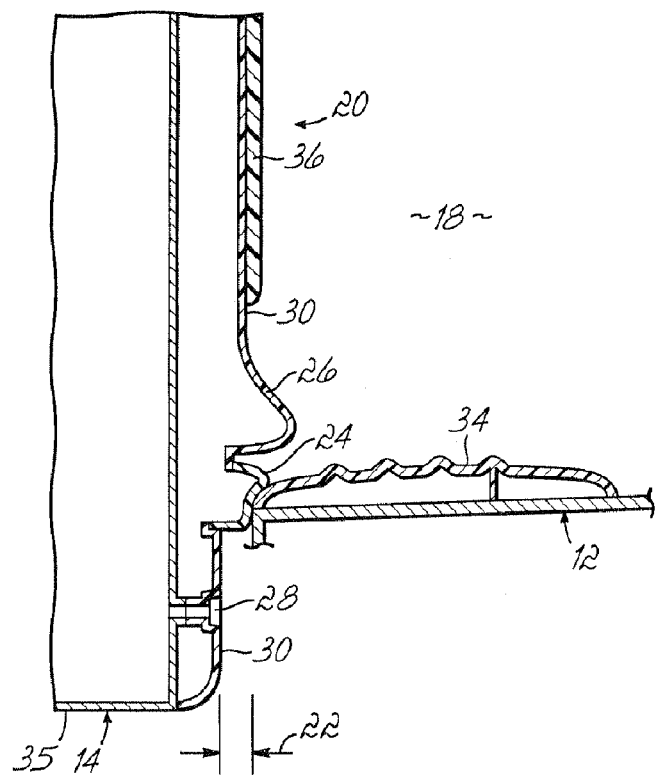
FIG. 2 is a cross-sectional view of the door of FIG. 1 generally taken along line 2—2.

With reference to FIG. 1, a vehicle 10 includes a vehicle body 12 and a door 14 that covers or overlies an opening 16 in vehicle body 12 and provides access to a passenger compartment 18 of vehicle 10. The vehicle body 12 may broadly be any portion of the vehicle 10 that does not constitute a portion of the door 14. The door 14 is capable of movement relative to vehicle body 12 between an open position, wherein door 14 is moved away from opening 16 thus allowing passenger ingress or egress from the passenger compartment 18, and a closed position, wherein door 14 covers opening 16 thus preventing passenger ingress or egress from passenger compartment 18. To improve the aesthetic appearance of the passenger compartment 18, a trim panel 20 may be coupled with the inner door frame of door 14 so as to face passenger compartment 18. As discussed in more detail below, when the door 14 is in the closed position, at least a portion of trim panel 20 forms a gap 22 with vehicle body 12. To fill the gap 22 between the trim panel 20 and vehicle body 12, trim panel 20 includes a resilient sealing member 24. The sealing member 24 engages a portion of the vehicle body 12 when door 14 is in the closed position to fill gap 22 and thereby prevent or reduce the ingress of air, water or noise into passenger compartment 18. For instance, as shown in FIGS. 1 and 2, door 14 may be a sliding door on a minivan. In many minivan door designs, the portion of the door 14 that forms a gap 22 with the vehicle body 12 is along the trim panel 20 itself. Those of ordinary skill in the art will recognize, however, that the invention may be used with different types of vehicles, such as automobiles, trucks, aircraft, etc. and other types of doors, such as hinged-type doors, wherein the trim panel includes a sealing member. Thus, while the invention is shown and described as a sliding door on a minivan, the invention is not so limited.

As shown in FIG. 2, the trim panel 20 includes a relatively rigid substrate member 26, which forms at least a portion of the structural support and defines the general shape of trim panel 20. The substrate member 26 may be made from various materials, such as structurally rigid thermoplastic or thermoset polymer materials like a thermoplastic polyolefin (e.g. polypropylene). The substrate member 26 is then secured with the interior of door 14 by a bracket or mounting member (not shown) as is known in the art. For instance, trim panel 20 may include a recess 28 for receiving a mounting member to secure trim panel 20 with door 14. When the trim panel 20 is so mounted, the substrate member 26 includes a front surface 30 that faces the passenger compartment 18 when the door 14 is in the closed position.

When in the closed position, trim panel 20 includes a lower portion 32 that extends below a portion of the vehicle body 12 adjacent the door 14. For instance, in many vehicles, a scuff plate 34 is coupled with the vehicle body 12 along a portion of the vehicle body 12 adjacent trim panel 20. In the closed position, a gap 22 is formed between the trim panel 20 and the vehicle body 12, such as between trim panel 20 and scuff plate 34. The gap 22 provides a pathway for air, water or moisture and road noise to undesirably enter the passenger compartment 18. To prevent air, water and road noise from undesirably entering passenger compartment 18, trim panel 20 includes a sealing member 24 integrally molded with the front surface 30 of substrate member 26. The sealing member 24 has an arcuate configuration that projects away from the front surface 30 of substrate member 26 and toward the passenger compartment 18. When the door 14 is in the open position, the sealing member 24 is moved away from vehicle body 12 and scuff plate 34. In this position, the sealing member is in its unflexed state.

On the other hand, when the door 14 is in the closed position, an outer portion of sealing member 24 engages the scuff plate 34 and readily deforms to form a seal between the trim panel 20 and the vehicle body 12. The sealing member 24 then closes the gap 22 thereby preventing air, water and road noise from entering the passenger compartment 18. In the particular application shown in FIG. 2, the trim panel 20 has a lower edge 35 and the sealing member 24 is integrally molded with the front surface 30 of substrate member 26 adjacent the lower edge 35. Those of ordinary skill in the art will recognize, however, that the invention is not so limited as the sealing member 24 may be positioned at other locations on the trim panel 20 when a gap is formed between the trim panel 20 and vehicle body 12. The sealing member 24 may be made from a material having a hardness that is relatively lower than the hardness of the substrate member 26. This gives the sealing member 24 a certain amount of flexibility so as to form the seal between the trim panel 20 and the vehicle body 12 when the door 14 is in the closed position. For example, the sealing member 24 may be made from a suitable thermoplastic elastomer material. Those of ordinary skill in the art will recognize other materials that may also be used to form the sealing member 24 in accordance with the invention.

For economy automobiles, the front surface 30 of substrate member 26 may include a decorative design, such as for example a grained or textured style formed directly in the front surface 30. For more luxury-oriented vehicles, however, a pliable cover member 36 may be disposed over at least a portion of the front surface 30 of substrate member 26 to provide an aesthetically pleasing appearance as well as to provide a soft touch to the trim panel 20. The cover member 36 may, for example, be cloth, vinyl, leather or other material coverings known in the art. For instance, in an advantageous aspect of the invention, a suitable thermoplastic elastomer material generally having a hardness that is relatively lower than the hardness of the substrate member 26 may be used in the invention. In this case then, the cover member 36 and sealing member 24 may be made from the same material although the invention is not so limited.

With reference to FIGS. 3–7, a method of making the trim panel 20 having an integrated sealing member 24 will now be described. In an advantageous aspect of the invention, the trim panel 20 may be formed in a two-shot molding process. To this end, a single mold assembly 40 includes spaced-apart first and second members 42, 44, and a mold core 46 situated between the members 42, 44. The mold core 46 has opposite first and second cavities 48, 50 each adapted to confront and mate with one of a corresponding first and second cavities 52, 54 defined in the members 42, 44. The mold core 46 is adapted to pivot so that the first and second cavities 48, 50 are confronting, in turn, with the first and second cavities 52, 54 to injection mold, in sequence, first the substrate member 26, then the sealing member 24. While the first and second shots of the injection molding operation are described below with respect to the first cavity 48, it is understood that the first and second shots of the two-shot molding operation may occur in the same fashion with respect to the second cavity 50.

Figure 3:
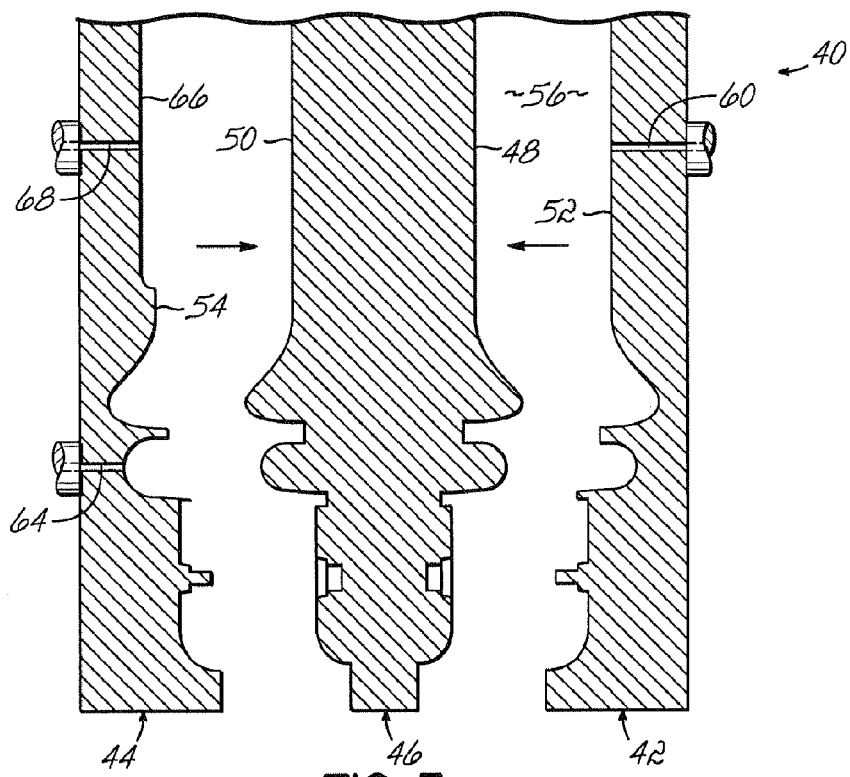
FIG. 3 is a diagrammatic cross-sectional view of a mold assembly used to make a trim panel in accordance with the invention.
Figure 4:
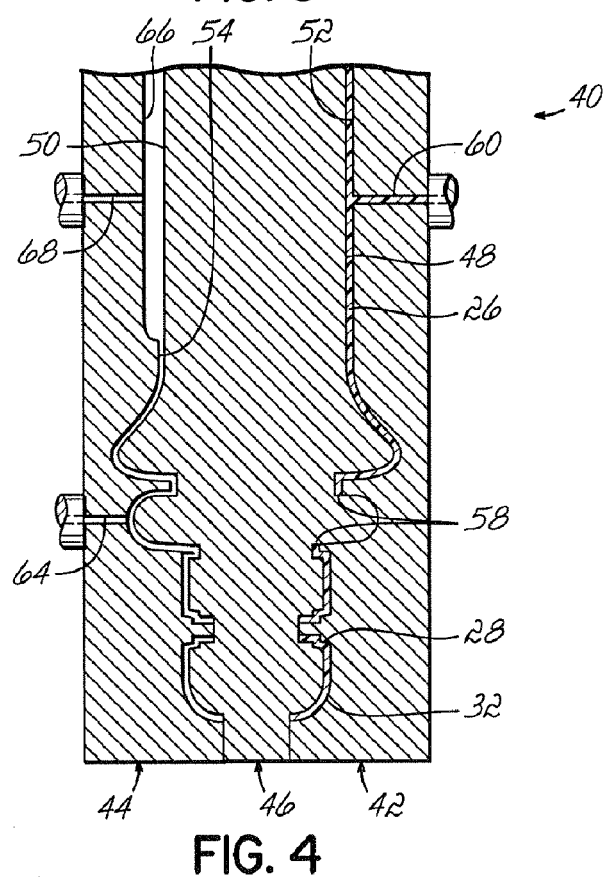
FIG. 4 is diagrammatic cross-sectional view of the mold assembly during the first shot of the molding operation.

As shown in FIGS. 3–4, the first cavity 48 of mold core 46 is moved into alignment with mold cavity 52 and mated with the first member 42 to define a closed first shot mold chamber 56 defined by cavities 48, 52. The first shot mold chamber 56 generally defines the shape of substrate member 26. As will be explained in more detail below, the substrate member 26 includes an opening 58 formed therein, which subsequently allows the sealing member 24 to be integrally molded with the substrate member 26. The opening 58 in substrate member 26 does not extend completely across the substrate member 26 but stops short of the longitudinal ends so that the portion of the substrate member 26 below the opening 58 is rigidly formed with the portion of the substrate member 26 above the opening 58, i.e., the substrate member 26 is a unitary structure. In a first shot of the molding operation, a first curable material suitable for forming substrate member 26 is injected through a channel 60 into first mold chamber 56. The first curable material may be a suitable thermoplastic or thermoset polymer, such as a thermoplastic polyolefin like polypropylene.

Figure 5:
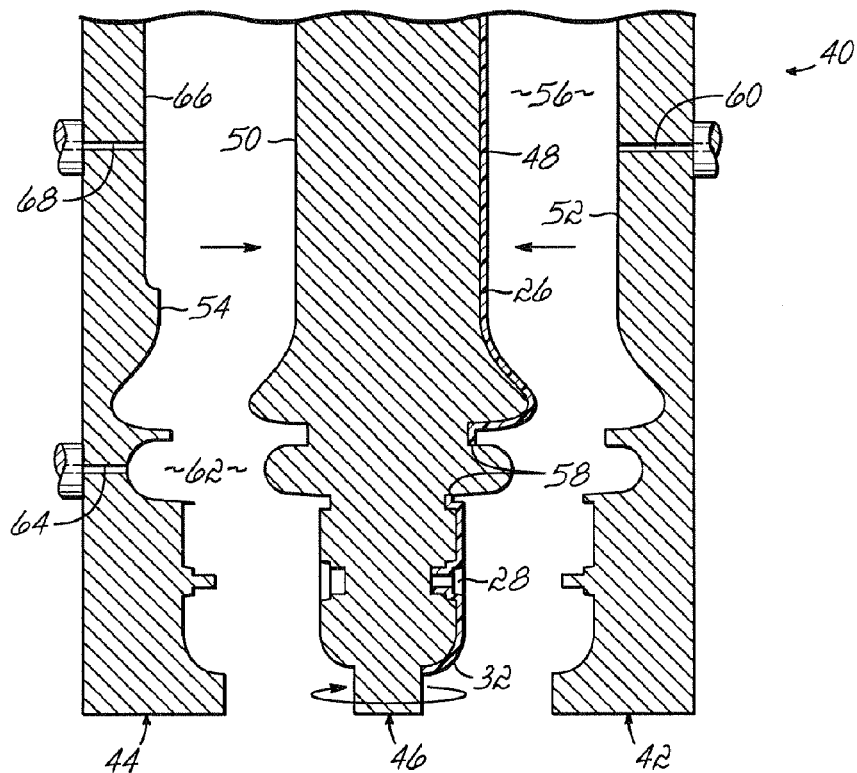
FIG. 5 is diagrammatic cross-sectional view of the mold assembly showing the rotation of the mold core and mating with the second mold member.
Figure 6:
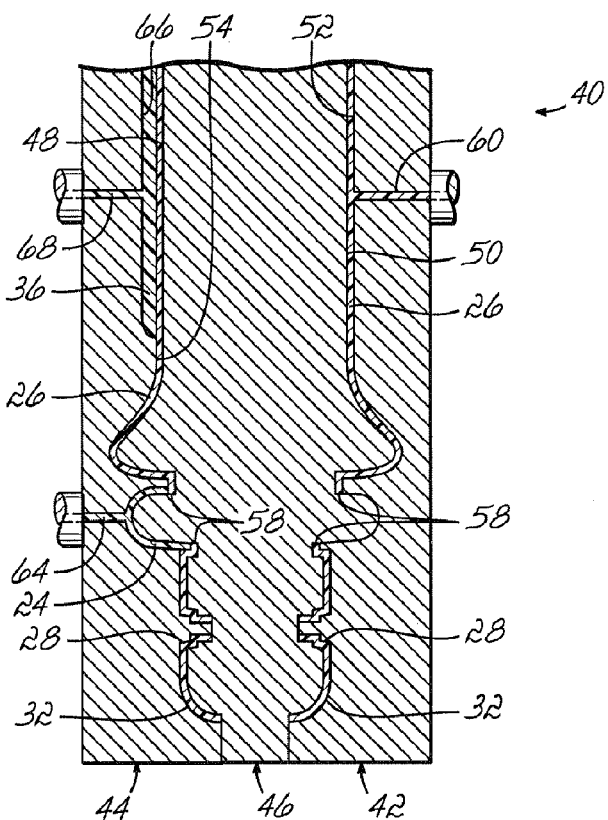
FIG. 6 is diagrammatic cross-sectional view of the mold assembly during the second shot of the molding operation.

As shown in FIGS. 5 and 6, the first member 42 is moved away from the mold core 46 and core 46 is rotated so that the first cavity 48 carrying substrate member 26 confronts and mates with the second mold cavity 54 to define a closed second shot mold chamber 62 about at least a portion of substrate member 26. The shape of the second shot mold chamber 62 generally defines the shape of sealing member 24, such as an arcuate shape projecting away from a surface of the substrate member 26. In a second shot of the two-shot molding operation, a second curable material is injected through a channel 64 into second mold chamber 62 to form the sealing member 24. The curable material injected into second mold chamber 62 bonds with the substrate member 26 adjacent a portion of substrate member 26 that defines opening 58. The first and second molten polymer materials may be selected to as to achieve good bonding between the sealing member 24 and substrate member 26. For instance, the second curable material may be a suitable thermoplastic elastomer material.

Furthermore, as shown in FIG. 6, when the core 46 is rotated so that the first cavity 48 confronts and mates with the second mold cavity 54, another second shot mold chamber 66 may be defined between the second mold cavity 54 and at least a portion of the substrate member 26. The mold chamber 66 generally defines the shape of the cover member 36. In the second shot of the two-shot molding operation, a curable material is injected through a channel 68 into the mold chamber 66 to form the cover member 36. The curable material injected into mold chamber 66 bonds with the substrate member 26 so that the cover member 36 is secured to the substrate member 26. By way of example, the curable material injected into the mold chamber 66 to form cover member 36 may be a suitable thermoplastic elastomer material having a hardness that is relatively lower than the hardness of the material of the substrate member 26.

Figure 7:
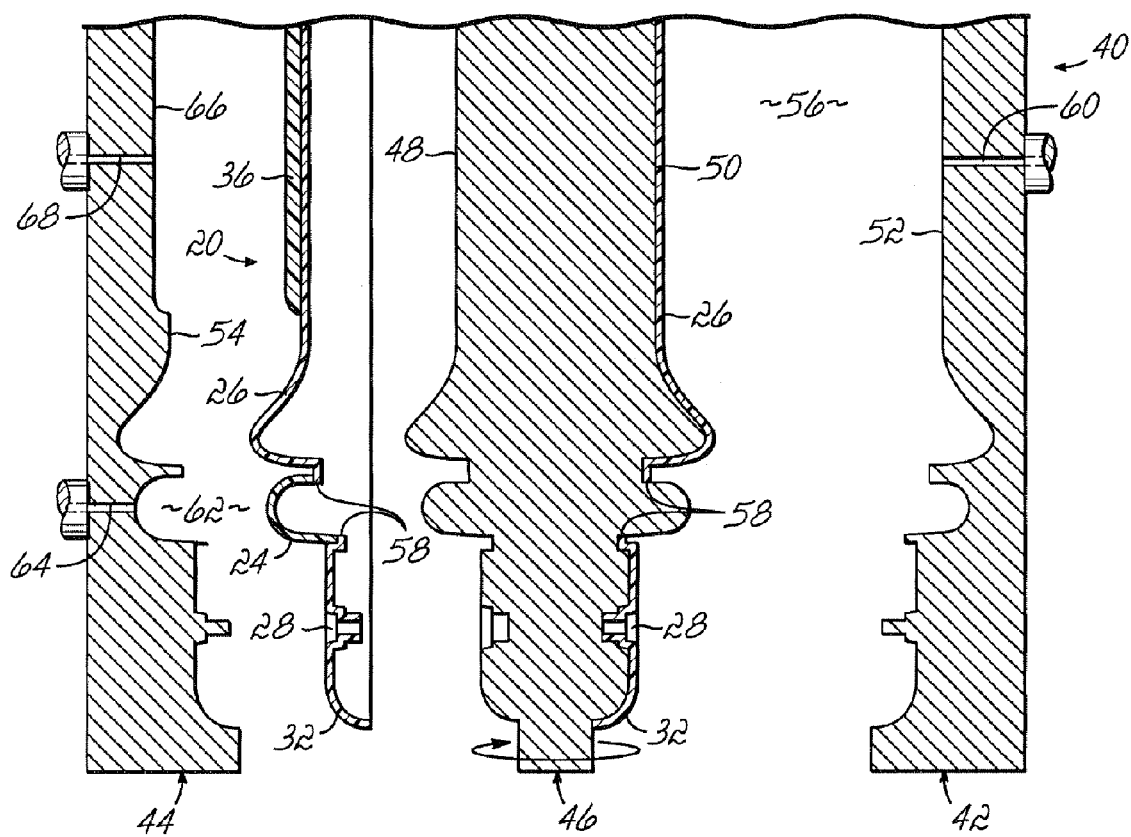
FIG. 7 is diagrammatic cross-sectional view of the mold assembly showing the removal of the trim panel from the mold assembly.

As shown in FIG. 7, after the trim panel 20 has cooled, the second member 44 is moved away from the core 46 and the trim panel 20 is ejected, such as with ejector pins (not shown) from the first cavity 48. The trim panel 20 is subsequently mounted to the interior of a door 14. The two-shot process is repeated to form additional trim panels 20 having an integrated sealing member 24. Although not illustrated, it is understood that the second cavity 50 also is adapted to confront and mate with the first member 42, during the mating of the first cavity 48 with the second member 44, to form a second substrate (not shown) identical to the first substrate 26 by injecting molten polymer material into the first shot mold chamber defined by cavities 50, 52 in the first shot of the molding operation. After injection, the mold core 46 is rotated to align the second cavity 50 with cavity 54 in the second member 44 and mated to define a second shot chamber for the second shot of the molding operation while the first cavity 48 returns to a confronting relationship with cavity 52 in the first member 42 to repeat the first shot of the molding operation. In this fashion, multiple trim panels 20 may be serially formed in a continuous and efficient manner.

Although the method of making utilizes a single mold assembly 40 for a continuous, integrated process, it still should be understood that the molding process may be performed in more than one mold assembly such that the trim panel 20 may be moved from the first shot mold cavity after the first shot to a second shot mold cavity provided in a second, separate mold assembly (not shown) for the second shot of the molding operation. Movement may be done manually or by other means commonly known in the art, e.g. robotically.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A trim panel adapted to mount to a door of a vehicle having an interior compartment, the door moveable between open and closed positions with respect to a vehicle body, the trim panel comprising:
    a substrate member forming at least a part of a structural support of the trim panel, said substrate member having a front surface adapted to face the interior compartment of the vehicle; and
    a sealing member integrally molded with said front surface of said substrate member and projecting therefrom, said sealing member adapted to engage a portion of the vehicle body so as to form a seal between said trim panel and the vehicle body when the door is in the closed position.

2. The trim panel of claim 1, wherein said substrate member has a first hardness and said sealing member has a second hardness that is relatively lower than said first hardness.

3. The trim panel of claim 1, wherein said substrate member is made from a material selected from the group consisting of a thermoplastic polymer and a thermoset polymer.

4. The trim panel of claim 1, wherein said sealing member is made from a thermoplastic elastomer.

5. The trim panel of claim 1, further comprising:
    a cover member overlying at least a portion of said front surface of said substrate member and adapted to provide a soft feel to the trim panel, wherein said substrate member has a first hardness and said cover member has a second hardness that is relatively lower than said first hardness.

6. The trim panel of claim 5, wherein said cover member is made from a thermoplastic elastomer.

7. The trim panel of claim 1, wherein said substrate member has a lower edge, said sealing member being integrally molded with said front surface of said substrate member adjacent said lower edge.

8. An automobile, comprising:
    a vehicle body having an opening for providing access to an interior compartment of the automobile;
    a door coupled with said vehicle body for covering said opening, said door moveable relative to said vehicle body between an open position allowing access to said interior compartment and a closed position preventing access to said interior compartment;
    a trim panel mounted to said door, said trim panel comprising:
        a substrate member forming at least a part of a structural support of said trim panel, said substrate member having a front surface adapted to face said interior compartment of the automobile; and
        a sealing member integrally molded with said front surface of said substrate and projecting therefrom, said sealing member adapted to engage a portion of said vehicle body so as to form a seal between said trim panel and said vehicle body when said door is in the closed position.

9. The automobile of claim 8, wherein said substrate member has a first hardness and said sealing member has a second hardness that is relatively lower than said first hardness.

10. The automobile of claim 8, wherein said substrate member is made from a material selected from the group consisting of a thermoplastic polymer and a thermoset polymer.

11. The automobile of claim 8, wherein said sealing member is made from a thermoplastic elastomer.

12. The automobile of claim 8, further comprising:
    a cover member overlying at least a portion of said front surface of said substrate member and adapted to provide a soft feel to said trim panel, wherein said substrate member has a first hardness and said cover member has a second hardness that is relatively lower than said first hardness.

13. The automobile of claim 12, wherein said cover member is made from a thermoplastic elastomer.

14. The automobile of claim 8, wherein said substrate member has a lower edge, said sealing member being integrally molded with said front surface of said substrate member adjacent said lower edge.

15. The automobile of claim 8, wherein said door is a sliding door.

* * * * *